Patented May 19, 1936

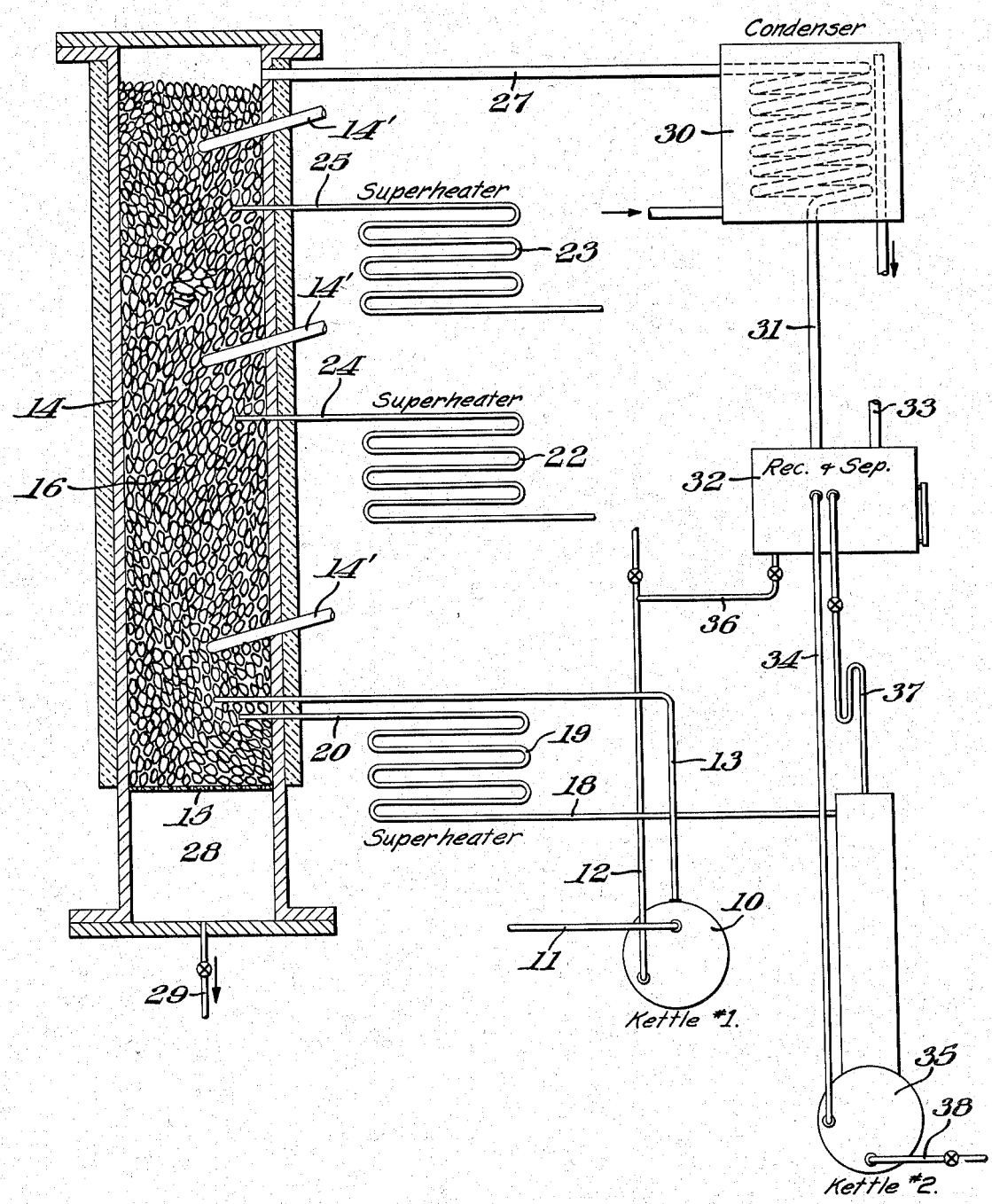

2,041,272

UNITED STATES PATENT OFFICE 2,041,272

MANUFACTURE OF GLYCOLS

René de M. Taveau, Newburgh, N. Y., assignor to The Texas Company, New York, N. Y., a corporation of Delaware Application August 11, 1934, Serial No. 739,439

7 Claims. (Cl. 260—156.5)

This invention relates to the manufacture of glycol by saponification of an alkyl dihalide in the presence of an alkaline earth carbonate or magnesium carbonate.

It is known to produce a glycol, such as ethylene glycol, by saponifying ethylene chloride with alkali or alkaline earth metal carbonates or bicarbonates by boiling in an autoclave under pressure and at temperatures of the order of 150°–170° C. The carbonates ordinarily employed comprise the alkaline earth carbonates, such as calcium, barium and strontium carbonates, and magnesium carbonate. This is a batch process, requiring a substantial time interval for reaction, enabling a number of side reactions to take place with reduction in yield of glycol considerably below the theoretical.

It has also been proposed to introduce a continuous stream of ethylene chloride into an autoclave of this character containing a water suspension of alkaline earth metal carbonate, with removal of vapors including acetaldehyde overhead and the concentration of ethylene glycol in the liquid remaining in the autoclave. This also subjects the glycol to high temperatures for a considerable period, with resulting side reactions and decomposition, thereby reducing the yield of the glycol. The ultimate removal of the glycol necessitates the termination of the reaction.

It is an object of the present invention to provide a continuous method of producing glycol by saponification in the presence of a water insoluble metal carbonate, such as an alkaline earth metal carbonate or magnesium carbonate, and a controlled amount of water vapor, thereby cutting down the time interval during which the reaction products are subjected to high temperatures, and enabling the recovery of the glycol to be effected in a continuous manner without suspending operations.

In accordance with the present invention, an alkyl dihalide in vapor form, is passed together with steam through a bed of water insoluble metal carbonate confined within a reaction zone or tower. The reaction zone is maintained at an elevated temperature above 150° C., generally about 160°–170° C. The alkyl dihalide vapor and steam may be formed by boiling a liquid mixture of the dihalide and water, thereby producing a constant boiling mixture of vapors. For example, in the case of ethylene chloride and water, a constant boiling mixture at atmospheric pressure is obtained at 72° C., consisting of 80.5% of ethylene chloride and 19.5% of water. The saponification according to the reaction $$C_2H_4Cl_2 + 2H_2O = C_2H_4(OH)_2 + 2HCl$$

requires a percentage of 26.7 of water to 73.3 of ethylene chloride. Additional steam at the proper temperature may be introduced into the tower to supply the additional water required for reaction, and this steam is preferably superheated to assist in maintaining the reaction zone at the desired elevated temperature. The steam also serves to carry over formed glycol with vapors escaping from the reaction zone, thereby removing the glycol rapidly from the tower. The vapors are subjected to condensation, with the result that the glycol together with steam and unreacted ethylene chloride are condensed. The condensed products are collected in a receiver where they are permitted to stratify into an upper aqueous glycol layer and a lower ethylene chloride layer. The glycol layer is removed, and the ethylene chloride may be returned to the constant boiling mixture for recycling through the process. The glycol may then be concentrated by heating with the production of steam, and the latter is preferably superheated and then returned to the reaction zone.

Referring to the drawing, in which the single figure is a diagrammatic view of apparatus for carrying out the method of this invention, a kettle is indicated at 10 to which water is supplied by line 11, and ethylene chloride by line 12. The kettle is heated in any suitable manner to the boiling point of the mixture. The proportions of ethylene chloride and water are preferably regulated to approximate those of the constant boiling mixture, so that the vapors passing off from the kettle comprises substantial proportions of both ethylene chloride and steam. These vapors pass by line 13 into the lower portion of a reaction tower 14, which is preferably heat insulated and provided with thermometer wells 14'. The tower is provided adjacent the lower end thereof with a perforated false bottom or plate 15, which may be made of lead, and which serves to support above the plate a mass of water insoluble metal carbonate 16 in lump form. The carbonate may be a normal carbonate or bicarbonate of magnesium, calcium, barium or strontium. Additional steam is supplied by line 18 through superheating coil 19 and line 20 into the lower portion of the tower to thereby maintain the carbonate and the reaction zone at an elevated temperature above 150° C. Additional steam may be supplied through superheaters 22 and 23 into the tower at various elevations thereof as indicated at 24 and 25 respectively. The tower may be maintained under pressure, although high pressure is unnecessary. Merely the pressure of the steam and constant boiling mixture, which may amount to a few pounds above atmospheric, is satisfactory.

In the presence of the carbonate and steam, the ethylene chloride is saponified to a certain extent with the formation of ethylene glycol. While the boiling point of glycol is 198° C., thus some 20°–30° C. above the temperature of the reaction zone, the introduction of excess superheated steam serves to carry over glycol along with the vapors which escape by vapor line 27 from the upper portion of the tower, as well as to maintain the tower at the reaction temperature. Any glycol condensing within the tower, and which may form a liquid reaction product with the alkaline earth metal chloride resulting from the reaction of HCl with the carbonate, may be withdrawn from the space 28 beneath perforated plate 15 at the base of the tower by the valve controlled drawoff line 29. This may be passed to a suitable distillation vessel (not shown) where the glycol is distilled off and recovered.

Vapors passing off by line 27 flow through a water cooled coil condenser 30, where they are mainly liquefied. The condensed products pass by line 31 to a receiver and separating vessel 32, where the liquid products are permitted to stand and stratify into an upper aqueous glycol layer and a lower ethylene chloride layer. The receiver is provided with a vent 33 from which uncondensed vapor including $CO_2$ produced in the reaction of HCl with the carbonate, may escape, or be withdrawn to a suitable recovery apparatus (not shown). The glycol, diluted by condensed steam, is withdrawn from receiver 32 by overflow line 34 to a kettle 35 which is heated in any suitable manner to concentrate the glycol. Steam produced by the concentration is removed from the upper portion of the vapor space of kettle 35 by line 18, and thence passed through superheating coil 19 for return to the reaction zone of tower 14. The lower layer of liquid consisting of ethylene chloride from receiver and separator 32, is passed by valve controlled line 36 to line 12 and thence to kettle 10, whereby the unreacted chloride is returned to the constant boiling mixture. The kettle 35 is also provided with a valve controlled reflux line 37 communicating with the receiver whereby a controlled amount of aqueous glycol solution is fed to the reflux space of the kettle. Concentrated glycol solution is drawn off from kettle 35 by valve controlled line 38.

While the method and apparatus have been described specifically in connection with the production of ethylene glycol from ethylene chloride, it is to be understood that they are applicable to the production of other glycols from alkyl dihalides, such for example as the production of propylene glycol from propylene chloride or bromide, and the like.

Obviously many modifications and variations of the invention, as hereinbefore set forth, may be made without departing from the spirit and scope thereof, and therefore only such limitations should be imposed as are indicated in the appended claims.

I claim:

1. In the manufacture of a glycol by saponifying an alkyl dihalide in the presence of a water insoluble metal carbonate, the continuous process which comprises passing a mixture of alkyl dihalide vapor and steam at an elevated temperature above 150° C. but below the normal boiling point of formed glycol through a mass of metal carbonate selected from the group consisting of alkaline earth metal carbonates and magnesium carbonate, introducing excess superheated steam into the reaction zone containing metal carbonate to distil over glycol at a temperature below the normal boiling point thereof, and separating glycol from the vapors withdrawn from the reaction zone.

2. In the manufacture of a glycol by saponifying an alkyl dihalide in the presence of a metal carbonate, the continuous process which comprises passing a mixture of alkyl dihalide vapor and steam through a mass of metal carbonate selected from the group consisting of alkaline earth metal carbonates and magnesium carbonate maintained at an elevated temperature of the order of 150–170° C., introducing additional steam into the mass of metal carbonate to maintain the elevated temperature of the latter, and to assist in continuously removing formed glycol from the reaction zone by carrying overhead with vapors escaping from the reaction zone at a temperature below the normal boiling point of the formed glycol, condensing the overhead vapor, separating glycol from the condensed products, concentrating the separated glycol with the production of steam, and returning the steam to the reaction zone.

3. In the manufacture of ethylene glycol by saponifying ethylene chloride in the presence of a metal carbonate, the continuous process which comprises passing a mixture of ethylene chloride vapor and steam through a mass of metal carbonate selected from the group consisting of alkaline earth metal carbonates and magnesium carbonate, maintaining the mass of metal carbonate constituting the reaction zone at a temperature above 150° C. but below the normal boiling point of ethylene glycol, introducing excess superheated steam into the reaction zone to carry over ethylene glycol with the vapors escaping from the reaction zone, and separating ethylene glycol from the vapors withdrawn from the reaction zone.

4. In the manufacture of a glycol by saponifying an alkyl dihalide in the presence of a metal carbonate, the continuous process which comprises boiling a liquid mixture of alkyl dihalide and water to form a constant boiling mixture of alkyl dihalide vapor and steam, passing the mixture in vapor form through a mass of metal carbonate selected from the group consisting of alkaline earth metal carbonates and magnesium carbonate and constituting a reaction zone, introducing additional superheated steam to the reaction zone to maintain the metal carbonate at a temperature above 150° C. but below the normal boiling point of the formed glycol and to carry overhead formed glycol with the vapors escaping from the reaction zone, and separating glycol from the vapors removed from the reaction zone.

5. In the manufacture of a glycol by saponifying an alkyl dihalide in the presence of a metal carbonate, the continuous process which comprises boiling a liquid mixture of alkyl dihalide and water to form a constant boiling mixture of alkyl dihalide vapor and steam, passing the mixture in vapor form through a mass of metal carbonate selected from the group consisting of alkaline earth metal carbonates and magnesium carbonate maintained at a temperature above 150° C. but below the normal boiling point of formed glycol, adding additional steam to carry over formed glycol with the vapors, condensing vapors passing off from the reaction zone, separating glycol from the condensation products, returning remaining condensed liquid to the constant boiling mixture, concentrating the separated glycol with production of steam, superheating the steam thus formed, and returning the superheated steam to the reaction zone.

6. In the manufacture of ethylene glycol by saponifying ethylene chloride in the presence of a metal carbonate, the continuous process which comprises boiling a liquid mixture of ethylene chloride and water to form a constant boiling mixture of ethylene chloride vapor and steam, passing the mixture in vapor form through a mass of metal carbonate selected from the group consisting of alkaline earth metal carbonates and magnesium carbonate maintained at a temperature above 150° C. but below the normal boiling point of ethylene glycol and constituting a reaction zone, introducing additional superheated steam to the reaction zone to maintain the elevated temperature of the reaction zone and to carry over formed ethylene glycol with the vapors escaping from said zone, and separating ethylene glycol from the vapors removed from the reaction zone.

7. In the manufacture of ethylene glycol by saponifying ethylene chloride in the presence of a metal carbonate, the continuous process which comprises boiling a liquid mixture of ethylene chloride and water to form a constant boiling mixture of ethylene chloride vapor and steam, passing the mixture in vapor form through a mass of metal carbonate selected from the group consisting of alkaline earth metal carbonates and magnesium carbonate, introducing additional superheated steam to the reaction zone to maintain the metal carbonate at a temperature of about 150–170° C. and to carry over ethylene glycol with the vapors escaping from the reaction zone, condensing the escaping vapors, separating ethylene glycol from the condensation products, returning remaining condensed liquid to the constant boiling mixture, concentrating the ethylene glycol with production of steam, superheating the steam thus formed, and returning the superheated steam to the reaction zone.

RENÉ DE M. TAVEAU.